(12) United States Patent
Zhu et al.

(10) Patent No.: US 9,715,570 B1
(45) Date of Patent: Jul. 25, 2017

(54) SYSTEMS AND METHODS FOR MODELING ASYMMETRIC VIAS

(71) Applicant: SAS IP, Inc., Cheyenne, WY (US)

(72) Inventors: Guangran Zhu, Oakdale, PA (US); Werner Thiel, Pittsburgh, PA (US); J. E. Bracken, Harrison City, PA (US)

(73) Assignee: Ansys, Inc., Canonsburg, PA (US)

( * ) Notice: Subject to any disclaimer, the term of this patent is extended or adjusted under 35 U.S.C. 154(b) by 90 days.

(21) Appl. No.: 14/796,232

(22) Filed: Jul. 10, 2015

Related U.S. Application Data

(60) Provisional application No. 62/024,897, filed on Jul. 15, 2014.

(51) Int. Cl.
G06F 17/50 (2006.01)

(52) U.S. Cl.
CPC ...... *G06F 17/5081* (2013.01); *G06F 17/5009* (2013.01)

(58) Field of Classification Search
USPC .......................................................... 716/111
See application file for complete search history.

(56) References Cited

U.S. PATENT DOCUMENTS

| | | | | |
|---|---|---|---|---|
| 2004/0176938 A1* | 9/2004 | Gisin | ................. | G06F 17/5036 703/14 |
| 2007/0074905 A1* | 4/2007 | Lin | .................... | G06F 17/5068 174/263 |
| 2007/0244684 A1* | 10/2007 | Murugan | ............ | G06F 17/5036 703/14 |
| 2010/0332207 A1* | 12/2010 | Wang | ................. | G06F 17/5036 703/14 |
| 2012/0150523 A1* | 6/2012 | Choi | ................... | G06F 17/5018 703/14 |
| 2012/0215515 A1* | 8/2012 | Norte | ................... | H05K 1/0251 703/14 |
| 2012/0221990 A1* | 8/2012 | Dai | ..................... | G06F 17/5045 716/112 |

\* cited by examiner

*Primary Examiner* — Mohammed Alam
(74) *Attorney, Agent, or Firm* — Jones Day

(57) ABSTRACT

Systems and methods are provided for analyzing a via. A physical representation of a via intersecting with an upper layer and a lower layer is received, the physical representation comprising: (i) a pair of pad dimensions comprising an upper pad dimension a1 and a lower pad dimension a2, and/or (ii) a pair of anti-pad dimensions comprising an upper anti-pad dimension b1 and a lower anti-pad dimension b2, where at least one of first and second conditions: (A) the first condition being a1 is different than a2, and (B) the second condition being b1 is different than b2, is true. A determination is made as to which, if any, of the conditions are true. At least one model parameter is selected based on the determination. An admittance parameter corresponding to a section of the via located between the upper and lower layers is computed using the selected model parameter.

22 Claims, 10 Drawing Sheets

SYSTEMS AND METHODS FOR MODELING ASYMMETRIC VIAS

CROSS REFERENCE TO RELATED APPLICATIONS

This application claims priority to U.S. Provisional Patent Application No. 62/024,897, filed Jul. 15, 2014, and entitled "System and Method for Modeling Asymmetric Vias," the entirety of which is herein incorporated by reference.

FIELD

The present invention relates generally to techniques for analysis of circuitry and, in particular, to systems and methods for analyzing inter-layer interconnects or vias using physical parameters thereof.

BACKGROUND

Modern electronic circuitry can be manufactured in several different forms, e.g. printed circuit boards (PCB's), semiconductor integrated circuits (IC's), and packaging technologies such as ball grid arrays (BGA's). All of these manufacturing technologies produce structures that are stacks of several layers. Packages and PCBs start with an insulating core layer and then add alternating layers of metal and insulator above and below the core layer. IC's start with a semiconductor substrate or "die" and add layers of insulator and metal to the top of the substrate. The metal layers are used to distribute electrical power and ground supplies to the active circuitry, or to connect analog and digital electrical signals from one circuit device to another. The insulating layers prevent unintended electrical connections from forming between neighboring metal layers. These insulating layers may all be the same material, or could be different materials or even air.

Metal layers are often dedicated entirely to a specific purpose: for example distributing power and ground supplies, or for routing electrical signals. Layers used for distributing power and ground supplies are often referred to as metal planes or conducting planes. They are almost entirely covered in metal, except for gaps needed to separate different supply voltages, and small "anti-pad" holes described below. Layers used for routing signals generally have much less metal coverage. The metallization here is typically in the form of narrow "traces" or transmission lines.

In order to provide connectivity between pathways or components on two different layers, a via can be used. A via is a conductor that connects at least two different metal layers. Vias can be manufactured by making a hole in one or more insulating layers and then completely or partially filling the hole with metal. Often the resulting via will be cylindrical in form. The upper and lower layers that a via connects can be but are not necessarily the topmost and the lowermost metal layers in the layer stack described above. Also, the upper and lower layers can be a pair of adjacent conductive layers, or there can be one or more intervening conductive layers. More than one via can facilitate electrical communication between a particular pair of upper and lower conductive layers.

In general, a via simply passes through the intervening layers, and is not physically connected to any pathway or circuit component in such intervening layers. To this end, a via passes through an opening in an intervening layer without physically contacting the layer. Therefore, a gap is present between an outer surface of the via at or near the plane of the intervening layer and an inner edge of the opening. At or near the plane of the intervening layer, within the gap, the barrel of the via may be surrounded by a portion coupled thereto called a pad. For such vias, a gap is present in or near the plane of the intervening layer between an outer edge of the pad and the inner edge of the opening through which the via passes.

In general, vias are ubiquitous components on printed circuit boards and electronic packages and are responsible for routing signals and for distributing power. Individually analyzing electrical properties of hundreds or thousands of vias using full-wave numerical methods can be computationally prohibitive. As such, in order to facilitate analysis or simulation of the circuitry, equivalent circuit models of vias can be created, and the values of the circuit elements in the models can be extracted using analytic methods. Such via models can be integrated with models of other objects, such as conductive layers or planes, transmission lines, passive/active components, etc., to form a circuit network to represent the PCB/packages or a portion thereof. Parameters of engineering significance of the PCB/packages can be also extracted.

SUMMARY

Systems and methods are provided for analyzing a via. A physical representation of a via intersecting with an upper circuit layer and a lower circuit layer is received, the physical representation comprising at least one of: (i) a pair of pad dimensions comprising an upper pad dimension a1 and a lower pad dimension a2, and (ii) a pair of anti-pad dimensions comprising an upper anti-pad dimension b1 and a lower anti-pad dimension b2, where at least one of first and second conditions: (A) the first condition being a1 is different than a2, and (B) the second condition being b1 is different than b2, is true. A determination is made as to whether only the first condition is true, only the second condition is true, or both the first and second conditions are true. At least one model parameter is selected based on the determination. An admittance parameter corresponding to a section of the via located between the upper and lower layers is computed using the selected model parameter.

As another example, a system for analyzing a via comprises a processing system that includes one or more data processors and a computer-readable medium encoded with instructions for commanding the processing system to execute a method. In the method, a physical representation of a via intersecting with an upper circuit layer and a lower circuit layer is received, the physical representation comprising at least one of: (i) a pair of pad dimensions comprising an upper pad dimension a1 and a lower pad dimension a2, and (ii) a pair of anti-pad dimensions comprising an upper anti-pad dimension b1 and a lower anti-pad dimension b2, where at least one of first and second conditions: (A) the first condition being a1 is different than a2, and (B) the second condition being b1 is different than b2, is true. A determination is made as to whether only the first condition is true, only the second condition is true, or both the first and second conditions are true. At least one model parameter is selected based on the determination. An admittance parameter corresponding to a section of the via located between the upper and lower layers is computed using the selected model parameter.

As a further example, a computer-readable medium is encoded with instructions for commanding one or more data processors to execute steps of a method for analyzing a via.

In the method, a physical representation of a via intersecting with an upper circuit layer and a lower circuit layer is received, the physical representation comprising at least one of: (i) a pair of pad dimensions comprising an upper pad dimension a1 and a lower pad dimension a2, and (ii) a pair of anti-pad dimensions comprising an upper anti-pad dimension b1 and a lower anti-pad dimension b2, where at least one of first and second conditions: (A) the first condition being a1 is different than a2, and (B) the second condition being b1 is different than b2, is true. A determination is made as to whether only the first condition is true, only the second condition is true, or both the first and second conditions are true. At least one model parameter is selected based on the determination. An admittance parameter corresponding to a section of the via located between the upper and lower layers is computed using the selected model parameter.

Various embodiments of the present invention provide for an improved via model that eliminates or reduces inaccuracies in circuit analysis/simulation introduced by an asymmetric structure of the via. This is achieved, in part, by receiving a model of the physical structure of the via, i.e., a model that specifies various dimensions associated with the via such as barrel lengths, pad lengths, gap (also called anti-pad) lengths etc., corresponding to different via sections. For each section, the relevant lengths are compared and based on these comparisons, a suitable sectional model customized for a particular asymmetry (e.g., an upper pad is larger than the lower pad, an upper gap is smaller than a lower gap, etc.), and for combinations of two or more individual asymmetries, is used to generate a corresponding sectional model.

DETAILED DESCRIPTION

Figure 3:
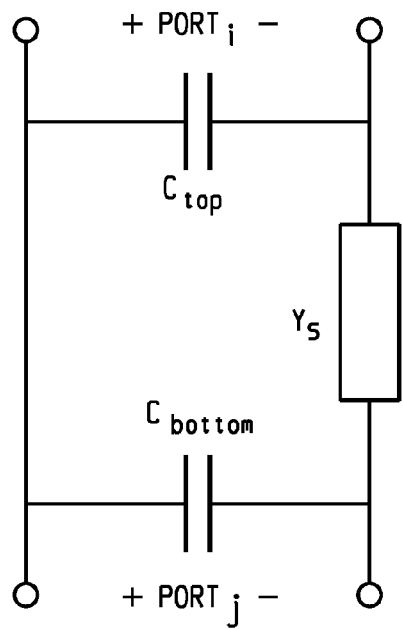
FIG. 3 is a diagram depicting a two-port circuit model for the via cavity block of FIG. 2.

A via model can be created in a section-by-section manner, where each sectional piece of the model corresponds to a section of the via between a pair of adjacent intervening layers. For example, in circuitry having a total of nine layers, labeled as Layer_1 through Layer_9 from top to bottom, a via may physically connect Layer_2 with Layer_7. As such, Layer_3, Layer_4, Layer_5, and Layer_6 are the intervening layers. An example model of the via includes three sectional models corresponding to the section between Layer_3 and Layer_4, the section between Layer_4 and Layer_5, and the section between Layer_5 and Layer_6. A sectional via model can be represented as a pi network (e.g., as shown in FIG. 3 and discussed further below).

Historical models required the corresponding via sections to be symmetrical. Specifically, for a sectional model corresponding to a pair of adjacent intervening layers "i" and "j," the model requires via pads to be either present in both layers "i" and "j" or not be used at all. If pads are used, the models require their lengths from the axis of the via in the planes of the layers "i" and "j" to be the same. The models also require the lengths of the gaps from the axis of the via in the planes of the layers "i" and "j" to be the same. In practice, however, vias are not symmetrical in many instances. For example, a pad may be used at the intersection with only one of the two intervening layers. The respective pad lengths associated with the two intervening layers or the respective gap lengths associated with the two intervening layers can be different. For example, one opening may be larger than the other opening. Such asymmetries can be introduced intentionally, to achieve certain beneficial circuit characteristics, or may be introduced unintentionally, e.g., due to tolerances in the manufacturing process. Historic models cannot account for these asymmetries and, as such, analysis or simulation based on these models can yield inaccurate results.

Figure 1:
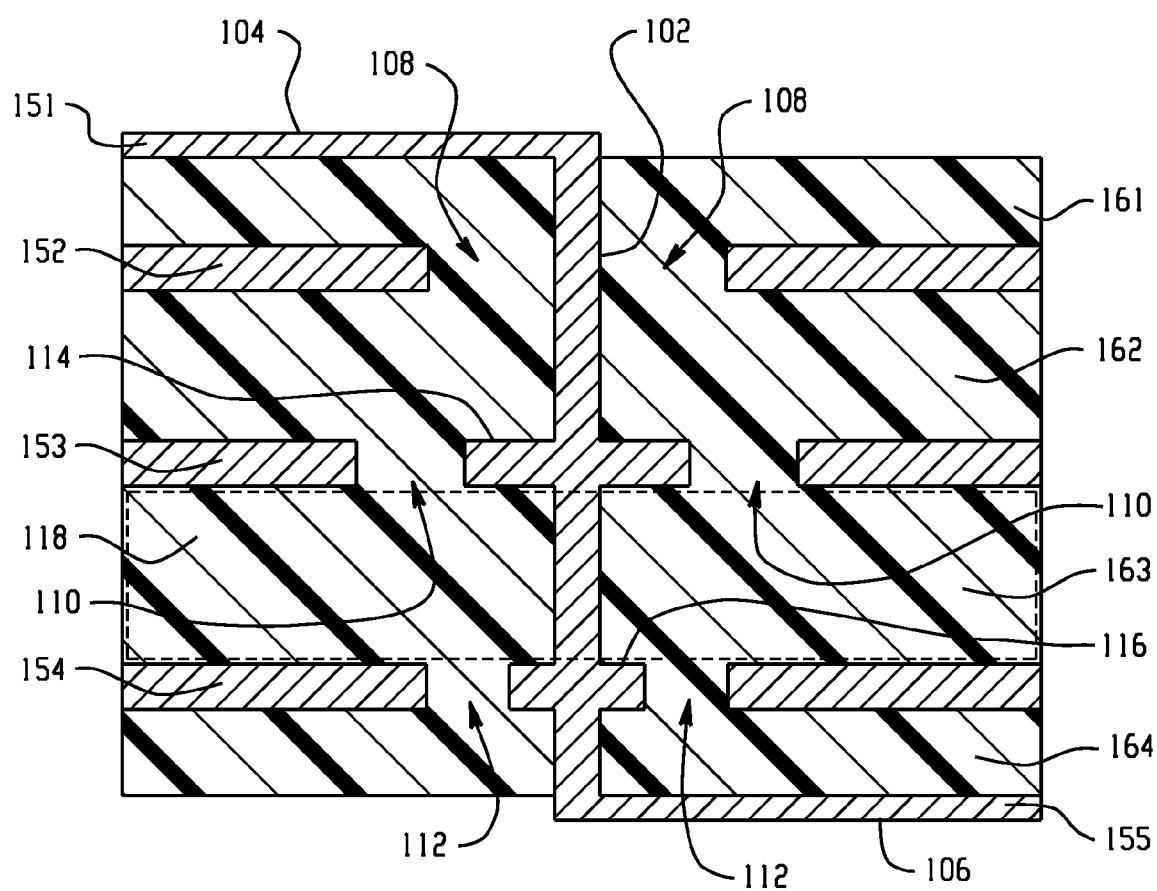
FIG. 1 is a diagram depicting a via that traverses a number of layers of a circuit.

With reference to FIG. 1, a via 102 physically connects a pathway 104 in circuit layer 1 151 to a pathway 106 in circuit layer 5 155. The five circuit layers 151-155 are separated by four dielectric layers 161-164. The via 102 passes through circuit layers 152, 153, 154, through respective openings 108, 110, 112. The sizes of the three openings are different. At the intersection with the layer 151, no pad is associated with the via 102. A pad 114 is coupled to the via 102 at the intersection with the circuit layer 3 153 and a pad 116 is coupled to the via 102 at the intersection with the circuit layer 154. The lengths of the pads 114, 116 are different. In generating a model of the via 102, the via (i.e., a physical model thereof) is divided into two sections: section 1 corresponding to the via portion between the circuit layers 2 and 3 152, 153 and section 2 corresponding to the via portion between the circuit layers 3 and 4 153, 154. A sectional model (e.g., a pi network) for each of these sections is then derived.

Figure 2:
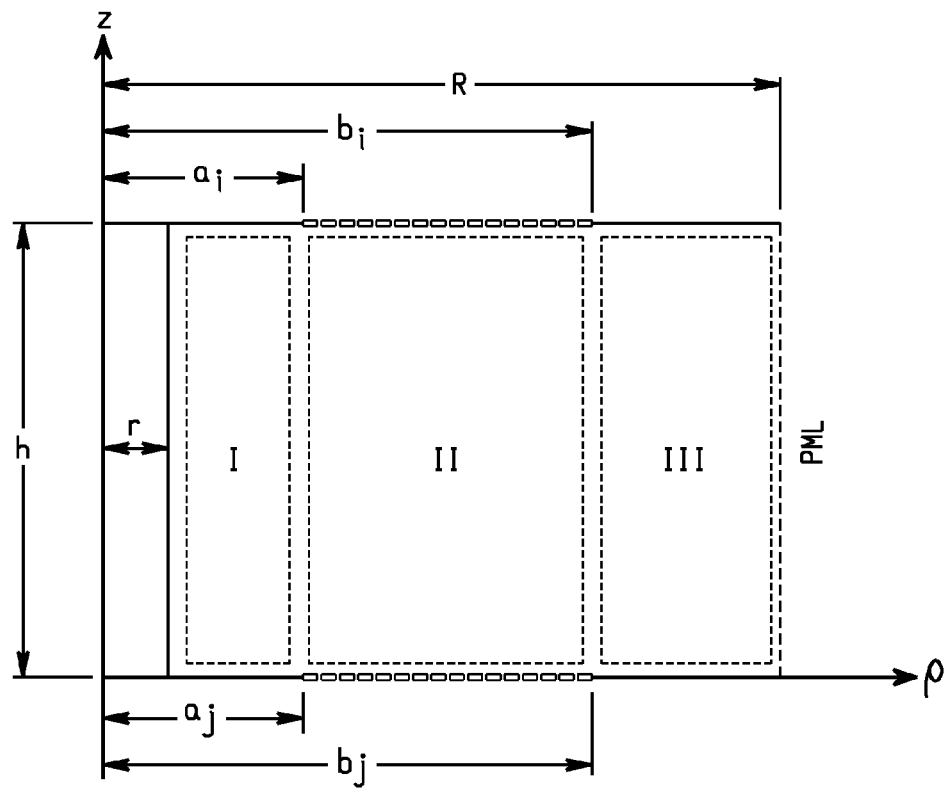
FIG. 2 is a diagram depicting an axial cross section of the via cavity block of FIG. 1.
Figure 4:
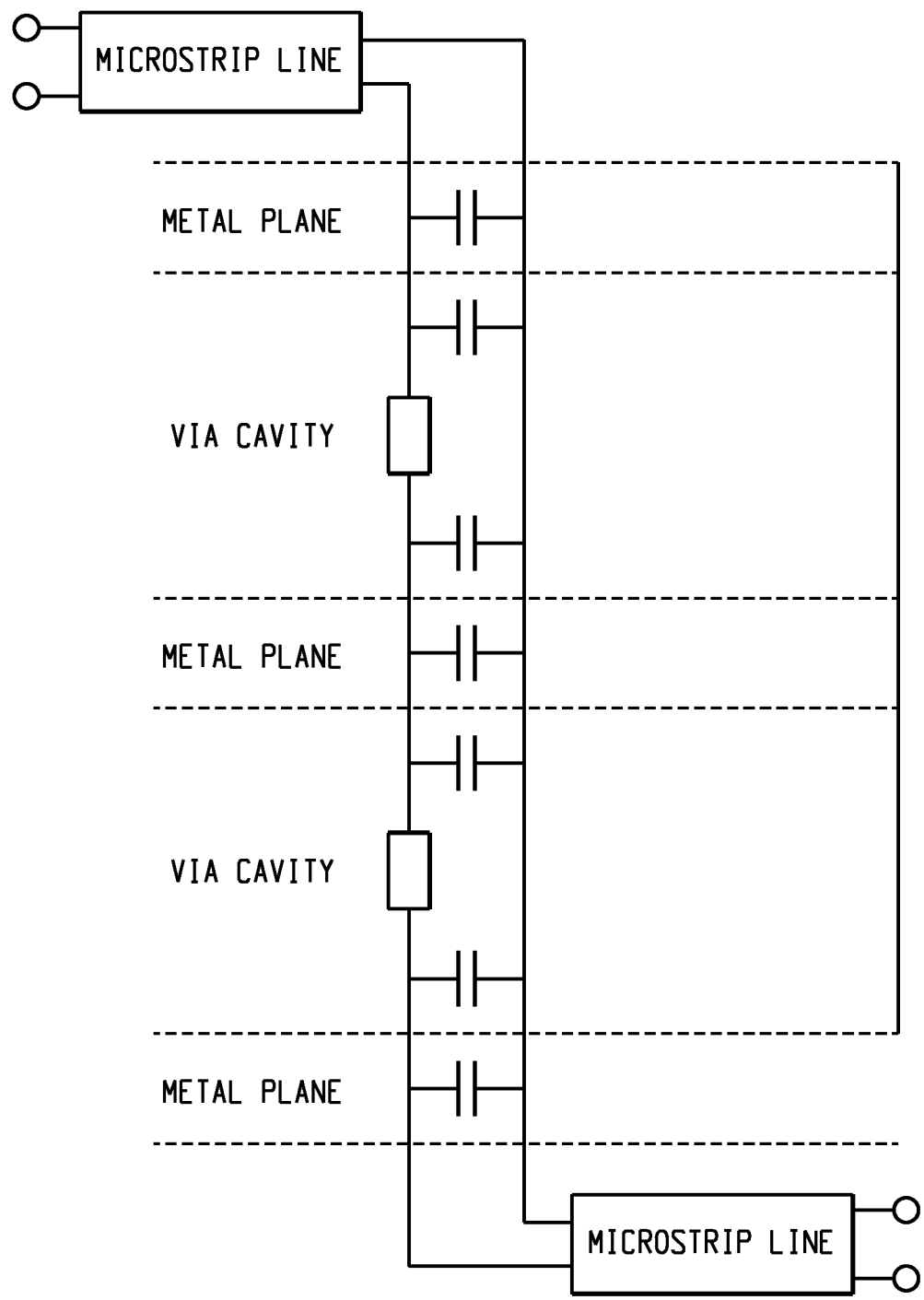
FIG. 4 is a diagram depicting a circuit representation of how a via cavity block is connected to a remainder of a circuit.

For example, section 2 can be represented by a via cavity block 118. In this block, the circuit layer 3 153 is a top or upper layer and the circuit layer 4 154 is a bottom or lower layer. The dimensions corresponding to the section 2 (i.e., cavity block 118), namely: via barrel radius (r) and layer separation (h), upper pad length a1, lower pad length a2, upper anti-pad length b1, and lower anti-pad length b2 are depicted in FIG. 2. A pi network that includes capacitances and an admittance that are based on the asymmetric via dimensions associated with section 2 (cavity block 118) is depicted in FIG. 3. The capacitance, as used herein, can be real valued or complex valued capacitance. Complex-valued capacitance allows for modeling a via section where the substrate or dielectric between the two layers of the section is lossy. The pi networks corresponding to via sections 1 and 2, respectively, together with models of other circuit components are depicted in FIG. 4.

It is noted that while certain of the examples provided herein describe vias that traverse one or more metal planes, useful designs can include configurations where one end of a via terminates on one of the conducting metal planes.

Systems and methods as described herein can generate models for those configurations and others as well. For example, the pi network depicted in FIGS. 3 and 4 and utilized when a via traverses a conducting metal plane can be modified to better represent the configuration where the via terminates at the metal plane under consideration There, instead of utilizing a top and bottom capacitor in the pi model, one of the capacitors can be replaced by a short circuit to represent the connection to the plane. The same or similar methods as described herein can be used to calculate characteristics of the remaining capacitor by setting the pad and anti-pad radius to be equal (e.g., $a_r = b_r$).

It should be understood that the terms top and bottom or upper and lower, though relative in nature, are specific to particular section that is analyzed. For example, in analyzing section 2, the circuit layer 3 153 is a top or upper layer, but while analyzing section 1, the circuit layer 2 152 is a top or upper layer, and the circuit layer 3 153 is a bottom or lower layer of the section 1. A comprehensive analysis of a via includes sectional analysis of all via sections corresponding to the different intervening circuit layers. The analysis of each section is based on a pair of corresponding, adjacent circuit layers separated only by one or more substrate layers. One of these circuit layers can be designated as a top or upper layer and the other one as the bottom or lower layer, for the purpose of analysis of that section of the via.

Figure 5:
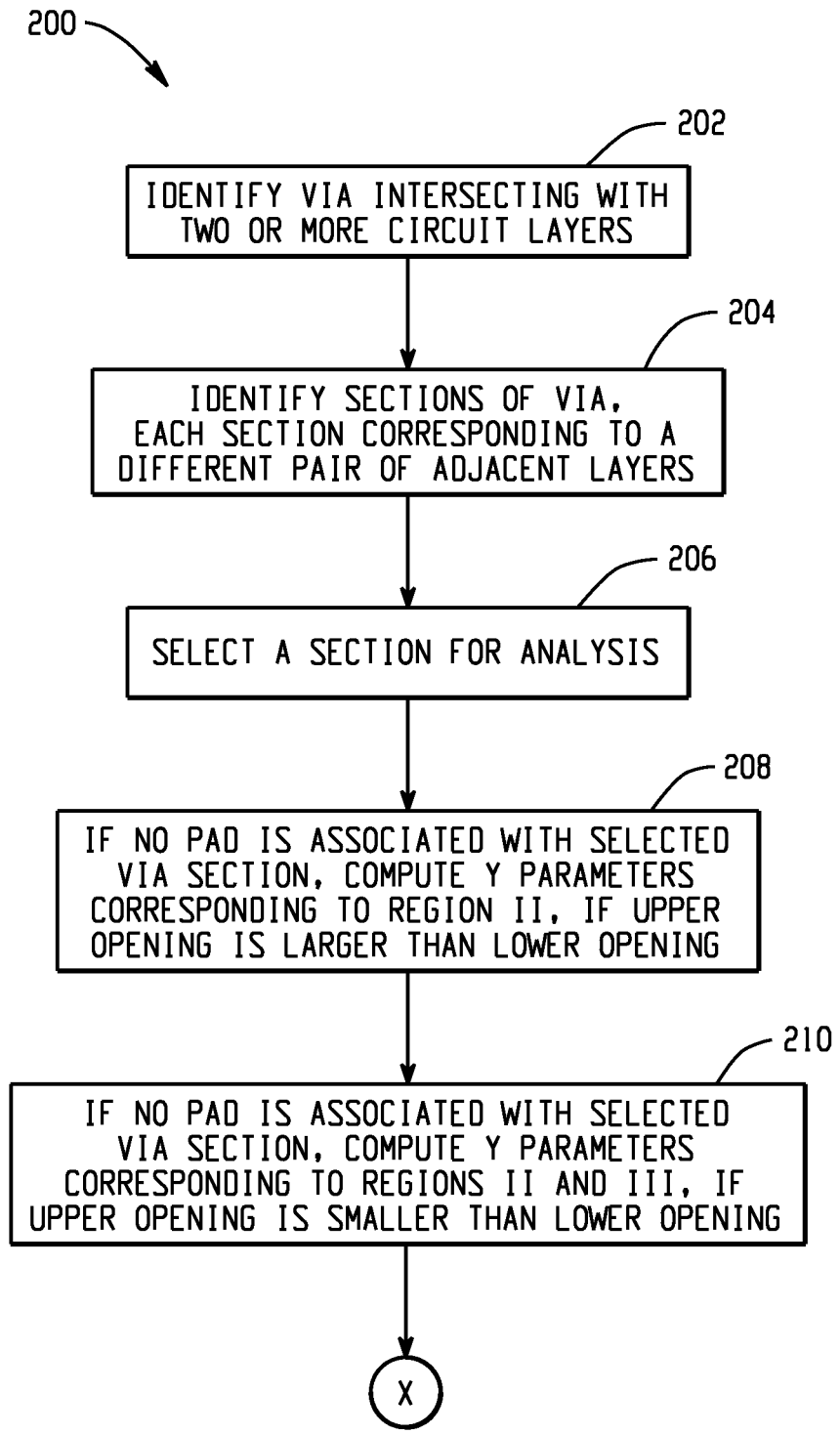
FIGS. 5 and 6 are a flow diagram depicting an example method of analyzing a via.
Figure 6:
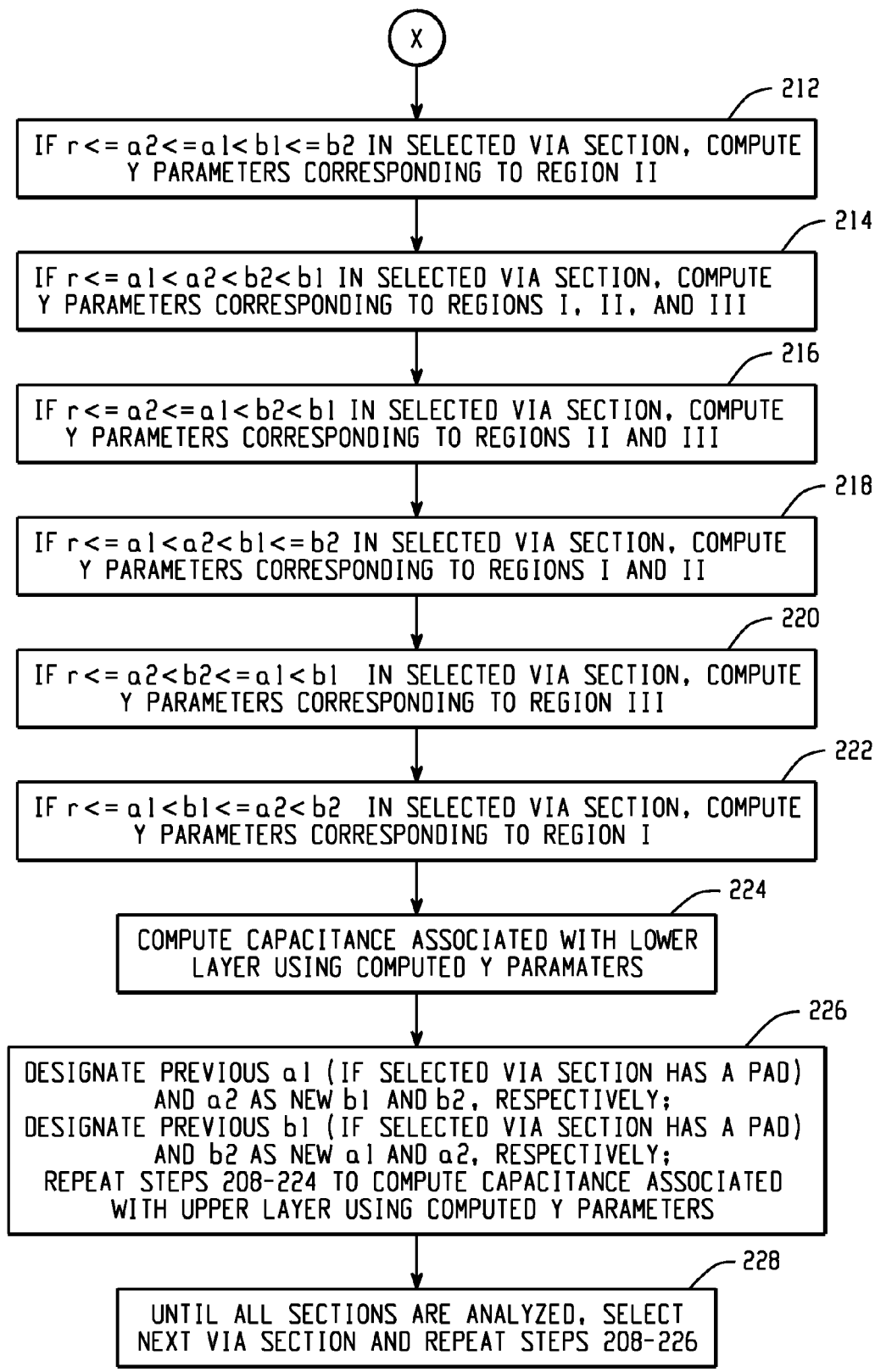

With reference to FIGS. 5 and 6, in a process 200, various geometric parameters relating to vias in circuitry to be analyzed are received in step 202. The parameters such as a1, a2, b1, b2, r and h, as described below and depicted in FIG. 2, are all generally stored in commonly used commercial electronic layout databases, such as Cadence Allegro, Mentor PADS, Zuken CR-5000 or the OpenAccess database, and can be extracted from such databases by an electrical analysis system. Such data extraction can be performed for any particular via structure in the layout. After receiving the data, a via penetrating more than one layers is identified at step 202. In step 204, different portions of the via, where each section is determined by a pair of adjacent circuit layers (i.e., layers that are separated by one or more substrate layers only and are not separated by any intervening circuit pathways, components, etc.) are generated. A particular section is selected for analysis in step 206. For the selected section, the capacitance between the via and the lower layer of the section is computed. To this end, in step 208, if no pad is associated with the via and if the upper opening is larger than a lower opening, admittance parameters are computed using model parameters corresponding to region II, as depicted in FIG. 2. In step 210, if no pad is associated with the via and if the upper opening is smaller than a lower opening, admittance parameters are computed using model parameters corresponding to region II and region III.

In step 212, if a length (a2) of the lower pad is less than or equal to a length (a1) of the upper pad, a length (b1) of the upper anti-pad is less than or equal to a length (b2) of the lower anti-pad, and if both pad dimensions (a1 and 2) are smaller than any anti-pad dimension (b1 or b2), admittance parameters are computed using model parameters corresponding to region II. These lengths (dimensions, in general) can be measured in the planes of the respective layers from the via axis, as shown in FIG. 2. In step 214, if a length (a1) of the upper pad is less than or equal to a length (a2) of the lower pad, a length (b2) of the lower anti-pad is less than or equal to a length (b1) of the upper anti-pad, and if both pad dimensions (a1 and 2) are smaller than any anti-pad dimension (b1 or b2), admittance parameters are computed using model parameters corresponding to regions I, II, and III.

In step 216, if a length (a2) of the lower pad is less than or equal to a length (a1) of the upper pad, a length (b2) of the lower anti-pad is less than or equal to a length (b1) of the upper anti-pad, and if both pad dimensions (a1 and 2) are smaller than any anti-pad dimension (b1 or b2), admittance parameters are computed using model parameters corresponding to regions II and III. In step 218, if a length (a1) of the upper pad is less than or equal to a length (a2) of the lower pad, a length (b1) of the upper anti-pad is less than or equal to a length (b2) of the lower anti-pad, and if both pad dimensions (a1 and 2) are smaller than any anti-pad dimension (b1 or b2), admittance parameters are computed using model parameters corresponding to regions I and II.

In step 220, if a length (a2) of the lower pad is less than a length (a1) of the upper pad, a length (b2) of the lower anti-pad is less than a length (b1) of the upper anti-pad, and if the length of the lower anti-pad (b2) is less than or equal to the length of the upper pad (a1), admittance parameters are computed using model parameters corresponding to region III. In step 222, if a length (a1) of the upper pad is less than a length (a2) of the lower pad, a length (b1) of the upper anti-pad is less than a length (b2) of the lower anti-pad, and if the length of the upper anti-pad (b1) is less than or equal to the length of the lower pad (a2), admittance parameters are computed using model parameters corresponding to region I. In step 224, the capacitance associated with the lower layer is computed using the admittance parameter(s) computed above. In step 226, to compute the capacitance between the via and the upper layer of the selected section, the via is flipped, i.e., the upper layer of the selected section is now considered to be the lower layer of that section, and the previously considered lower layer of the section is now considered to be the upper layer of the selected section. The steps 208-224 are then repeated using the flip-designated upper and lower layers to obtain new admittance parameters. The capacitance associated with the upper layer is computed using the newly computed admittance parameter(s). The next via section is selected in step 228, and the steps 208-226 are repeated for the next via section, until all via sections are evaluated.

The models for the various vias analyzed can be stored for subsequent analysis and simulation. For example, the via models can be integrated with a model of the circuitry for which the geometric data was received in step 202 and which is to be simulated (e.g., the circuit model of FIG. 4). Various circuit simulators/analyzers can then simulate the circuitry. While such simulators/analyzers can model the vias using previously known techniques, circuit simulation/analysis using these models can be inaccurate because the via models obtained using the previously known techniques do not account for asymmetries. The via modeling techniques described herein do account for such asymmetries, thereby enhancing the results obtained using circuit analyzers/simulators.

Following is further analysis of the simulation systems and methods described herein. When a via penetrates multiple conducting planes of a printed circuit board, the via body and two adjacent conducting planes form a cavity. The segment of a via between the planes is referred to as the cavity via. Cavity vias can be modeled by a pi network. The series impedance of the pi network represents the internal impedance of the via. The two legs of the pi network represent the external capacitance. Certain systems and methods described herein are concerned with finding the external capacitance when the cavity via is axially symmetric.

One method to extract the via capacitance starts from the observation that the physical dimension of a via is smaller compared to a wavelength at microwave frequencies. The electro quasi static assumption applies. The electric potential, V, satisfies the Laplace equation in the cylindrical coordinate system. On the surface of the via barrel and pads, V is set to V=1. On the surface of the top and bottom planes, V is set to V=0. In the anti-pad regions, V is set to ∂V/∂n=0. The solution of this boundary value problem is the potential in the dielectric region. Taking the negative gradient of this potential gives the electric field. Then, Gauss's law is applied by integrating the electric field on the surface that encloses the top plane, which gives the surface charge. Because it is assumed that the potential difference between the via and the plane is 1 V, the surface charge is the top-plane shunt capacitance. The same procedure is applicable to calculate the bottom-plane shunt capacitance. This method is referred to as the potential method.

Another method to extract the via capacitance is developed from the circuit perspective of the via. Because the via is modeled as a two-port network, the capacitance can be determined from the admittance matrix of the network. One approach calculates the element of the admittance matrix by directly integrating the magnetic field either around the barrel circumference for vias with no pads or around the pad circumference for vias with pads.

A third approach adopts the admittance formula defined in elements of the port power. This takes into account of the non-TEM field induced in the anti-pad region. The advantage of this full-wave method is that it leads to analytic solutions of the capacitance in the series form. This full-wave approach gives a better agreement than the results from the potential method and the direct admittance approach.

The systems and methods described herein expand the full-wave method in several ways extending the full-wave method to vias with non-symmetric anti-pads. The resulting admittance matrix rigorously satisfies reciprocity. The capacitance agrees well with those obtained from the numerical potential method over a wide frequency range for vias with small asymmetry. The analytic method is much faster than the numerical method.

Consider an axially symmetric via with asymmetric anti-pads shown in FIG. 2. Its equivalent circuit is shown in FIG. 3, which is a two-port network. The admittance matrix of this network is given by:

$$Y = \begin{bmatrix} Y_{ii} & Y_{ij} \\ Y_{ji} & Y_{jj} \end{bmatrix} \quad (1)$$

The elements of the admittance matrix are given by the following formula:

$$Y_{ij} = \frac{1}{V_i^* V_j} \int_{S_i} (\vec{E}_i^* \times \vec{H}_{ij}) d\vec{S}_i \quad (2)$$

where $V_i$ and $V_j$ are the port voltages. $E_i$ is the electric field in the $i^{th}$ anti-pad region. $H_{ij}$ denotes the magnetic field in the $i^{th}$ anti-pad region due $V_j$. The integral in eq. (2) is related to the port power. It is noted that the elements of the admittance matrix can also be defined in elements of the port reaction.

It is assumed that only the TEM mode is present in the $i^{th}$ anti-pad region. The electric field is given by:

$$\vec{E}_i = \frac{V_i}{\rho \ln(b_i / a_i)} \vec{a}_\rho \quad (3)$$

Substituting eq. (3) into eq. (2) gives:

$$Y_{ij} = \frac{1}{V_i^* V_j} \int_{a_i}^{b_i} \int_0^{2\pi} \frac{V_i^*}{\rho \ln(b_i / a_i)} H_{\phi,ij} \rho \, d\phi \, d\rho \quad (4)$$
$$= \frac{2\pi}{V_j \ln(b_i / a_i)} \int_{a_i}^{b_i} H_{\phi,ij} \, d\rho$$

The shunt capacitance between the via and the bottom plane is calculated from the elements in the admittance matrix, which is given by:

$$C_{bottom} = \frac{Y_{ij} + Y_{jj}}{I\omega} \quad (5)$$

The shunt capacitance between the via and the top plane is given by the formula:

$$C_{top} = \frac{Y_{ii} + Y_{ij}}{I\omega} \quad (6)$$

The series admittance is given by:

$$Y_s = -Y_{ij} = -Y_{ji} \quad (7)$$

when the network is reciprocal. The following text only discusses the bottom via-plane capacitance because the top-plane capacitance can be obtained by flipping the via geometry and calculating the new bottom via-plane capacitance.

The Green's function due to a magnetic frill current circulating at ρ=ρ' and z=z' in a parallel plate waveguide has two regions of validities. When ρ<ρ'

$$G(\rho, \rho', z, z') = \frac{-I\pi\rho'}{2h} \sum_{n=0}^{\infty} \epsilon_n J_1(k_n \rho) H_1^{(2)}(k_n \rho') \cos\left(\frac{n\pi}{h} z\right) \cos\left(\frac{n\pi}{h} z'\right) \quad (8)$$

where $e_n$=1 when n=0 and $\in_n$=2 when n≥1. When ρ'<ρ

$$G(\rho, \rho', z, z') = \frac{-I\pi\rho'}{2h} \sum_{n=0}^{\infty} \epsilon_n J_1(k_n \rho') H_1^{(2)}(k_n \rho) \cos\left(\frac{n\pi}{h} z\right) \cos\left(\frac{n\pi}{h} z'\right) \quad (9)$$

The magnetic field in the Φ direction due to the magnetic frill current in the region ρ'∈($a_j, b_j$) and z'=0 is given by the convolution with the Green's function.

$$H_\phi(a_j, b_j, \rho, z) = -L\Omega \in_{a_j}^{b_j} \int_0^h G(\rho, z, \rho', z') M_\phi(\rho', z') dz' d\rho' \quad (10)$$

Three regions are identified. In Region I, ρ<$a_j$. The magnetic field is given by:

$$H_\phi(a_j, b_j, \rho, z) = \qquad (11)$$

$$\frac{-\pi\omega\epsilon V_j}{2h\ln(b_j/a_j)} \sum_{n=0}^{\infty} \frac{\epsilon_n}{k_n}(H_0^{(2)}(k_n b_j) - H_0^{(2)}(k_n a_j))J_1(k_n\rho)\cos\left(\frac{n\pi}{h}z\right)$$

In Region II, $a_j < \rho < b_j$. The magnetic field is given by:

$$H_\phi(a_j, b_j, \rho, z) = \frac{-\pi\omega\epsilon V_j}{2h\ln(b_j/a_j)} \qquad (12)$$

$$\sum_{n=0}^{\infty} \frac{\epsilon_n}{k_n}\cos\left(\frac{n\pi}{h}z\right)\left(\frac{I2}{\pi k_n\rho} + J_1(k_n\rho)H_0^{(2)}(k_n b_j) - H_1^{(2)}(k_n\rho)J_0(k_n a_j)\right)$$

In Region III, $b_j < \rho$. The magnetic field is given by:

$$H_\phi(a_j, b_j, \rho, z) = \qquad (13)$$

$$\frac{-\pi\omega\epsilon V_j}{2h\ln(b_j/a_j)} \sum_{n=0}^{\infty} \frac{\epsilon_n}{k_n}(J_0(k_n b_j) - J_0(k_n a_j))H_1^{(2)}(k_n\rho)\cos\left(\frac{n\pi}{h}z\right)$$

Equations (11), (12), and (13) are the magnetic fields in the parallel plate. When a via with a radius of r is placed at the center of the coordinate, it reflects any incident electromagnetic wave. Let the reflection coefficient on the via barrel be denoted by $\Gamma$. The formula of the magnetic fields can be determined in the presence of this via. In Region I:

$$H_\phi^I(a_j, b_j, \rho, z) = \frac{-\pi\omega\epsilon V_j}{2h\ln(b_j/a_j)} \qquad (14)$$

$$\sum_{n=0}^{\infty} \frac{\epsilon_n}{k_n}(H_0^{(2)}(k_n b_j) - H_0^{(2)}(k_n a_j))(J_1(k_n\rho) + \Gamma H_1^{(2)}(k_n\rho))\cos\left(\frac{n\pi}{h}z\right)$$

In Region II:

$$H_\phi^{II}(a_j, b_j, \rho, z) = \frac{-\pi\omega\epsilon V_j}{2h\ln(b_j/a_j)} \sum_{n=0}^{\infty} \frac{\epsilon_n}{k_n}\cos\left(\frac{n\pi}{h}z\right) \qquad (15)$$

$$\left(\frac{I2}{\pi k_n\rho} + H_0^{(2)}(k_n b_j)J_1(k_n\rho) - J_0(k_n a_j)H_1^{(2)}(k_n\rho)\right) \qquad (16)$$

$$+\Gamma(H_0^{(2)}(k_n b_j) - H_0^{(2)}(k_n a_j))H_1^{(2)}(k_n\rho)) \qquad (17)$$

In Region III:

$$H_\phi^{III}(a_j, b_j, \rho, z) = \frac{-\pi\omega\epsilon V_j}{2h\ln(b_j/a_j)} \sum_{n=0}^{\infty} \frac{\epsilon_n}{k_n}\cos\left(\frac{n\pi}{h}z\right) \qquad (18)$$

$$((J_0(k_n b_j) - J_0(k_n a_j))H_1^{(2)}(k_n\rho) \qquad (19)$$

$$+\Gamma(H_0^{(2)}(k_n b_j) - H_0^{(2)}(k_n a_j))H_1^{(2)}(k_n\rho)) \qquad (20)$$

If the barrel is assumed to be a PEC, the reflection coefficient at this boundary is given by:

$$\Gamma = -\frac{J_0(k_n r)}{H_0^{(2)}(k_n r)} \qquad (21)$$

Because the magnetic field in eq. (4) is to be integrated to obtain the elements in the admittance matrix, the following auxiliary variables are defined to simplify notation:

$$K^I(a_j, b_j, \alpha, \beta, z) = \int_\alpha^\beta H_\phi^I(a_j, b_j, \rho, z) d\rho \qquad (22)$$

$$K^{II}(a_j, b_j, \alpha, \beta, z) = \int_\alpha^\beta H_\phi^{II}(a_j, b_j, \rho, z) d\rho \qquad (23)$$

$$K^{III}(a_j, b_j, \alpha, \beta, z) = \int_\alpha^\beta H_\phi^{III}(a_j, b_j, \rho, z) d\rho \qquad (24)$$

where $\alpha$ and $\beta$ specify the domain of the integration. The integrators in equations (22), (23), and (24) can be carried out explicitly with the assistance of the recursive relations in the Bessel functions:

$$K^I(a_j, b_j, \alpha, \beta, z) = \qquad (25)$$

$$\frac{-\pi\omega\epsilon V_j}{2h\ln(b_j/a_j)} \sum_{n=0}^{\infty} \frac{-\epsilon_n}{k_n^2}\cos\left(\frac{n\pi}{h}z\right)(H_0^{(2)}(k_n b_j) - H_0^{(2)}(k_n a_j))$$

$$((J_0(k_n\beta) - J_0(k_n\alpha)) + \Gamma(H_0^{(2)}(k_n\beta) - H_0^{(2)}(k_n\alpha)))$$

$$K^{II}(a_j, b_j, \alpha, \beta, z) = \frac{-\pi\omega\epsilon V_j}{2h\ln(b_j/a_j)} \qquad (26)$$

$$\sum_{n=0}^{\infty} \frac{+\epsilon_n}{k_n^2}\cos\left(\frac{n\pi}{h}z\right)\left[\frac{I2}{\pi}\ln(\beta/\alpha) - (H_0^{(2)}(k_n b_j)(J_0(k_n\beta) - J_0(k_n\alpha)) - \right.$$

$$J_0(k_n a_j)(H_0^{(2)}(k_n\beta) - H_0^{(2)}(k_n\alpha))) -$$

$$\left. \Gamma(H_0^{(2)}(k_n b_j) - H_0^{(2)}(k_n a_j))(H_0^{(2)}(k_n\beta) - H_0^{(2)}(k_n\alpha))\right]$$

$$K^{III}(a_j, b_j, \alpha, \beta, z) = \qquad (27)$$

$$\frac{-\pi\omega\epsilon V_j}{2h\ln(b_j/a_j)} \sum_{n=0}^{\infty} \frac{-\epsilon_n}{k_n^2}\cos\left(\frac{n\pi}{h}z\right)((J_0(k_n b_j) - J_0(k_n a_j)) +$$

$$\Gamma(H_0^{(2)}(k_n b_j) - H_0^{(2)}(k_n a_j))(H_0^{(2)}(k_n\beta) - H_0^{(2)}(k_n\alpha))$$

Figure 7:
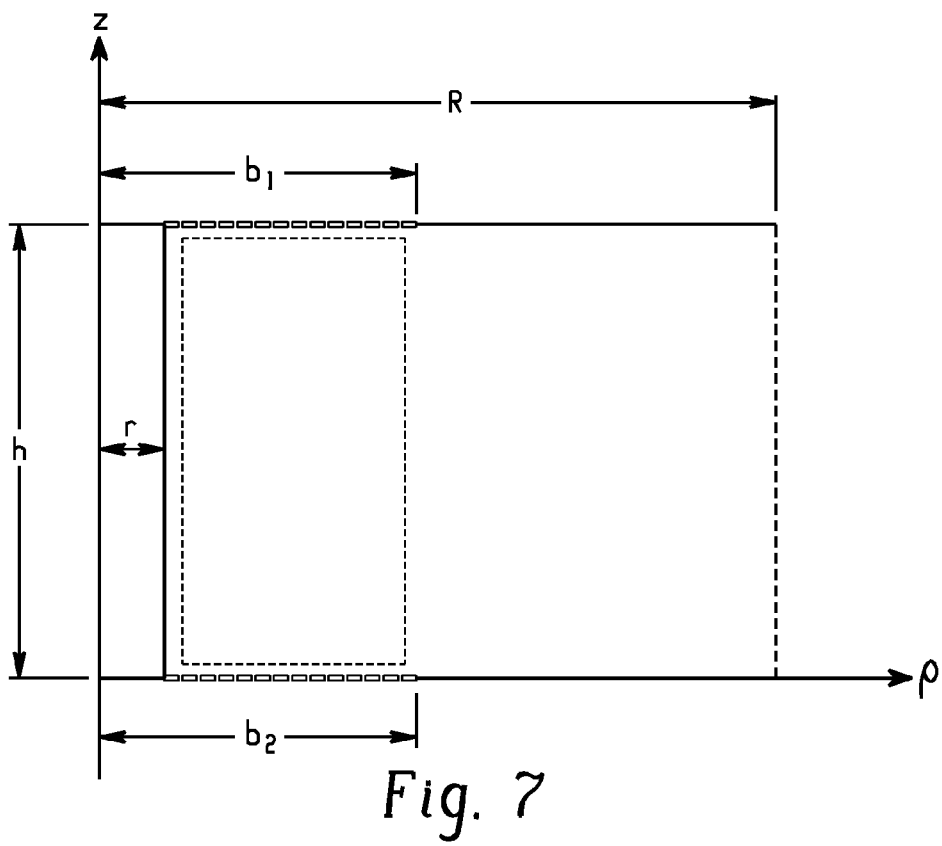
FIG. 7 is a diagram depicting a cross section of an axially symmetric via having $a_1=a_2=r$ and $b_1=b_2=b$.

Following is a review of capacitance extraction of symmetric vias. Consider a symmetric via with no pads ($a_1=a_2=r$, $b_1=b_2=b$), as shown in FIG. 7. The diagonal element of the admittance matrix is given by:

$$Y_{22} = \frac{2\pi}{V_2\ln(b/r)} K^{II}(r, b, r, b, 0) \qquad (28)$$

The off-diagonal element of the admittance matrix depends on the integration over the interval (r, b) at port 1:

$$Y_{12} = \frac{2\pi}{V_2\ln(b/r)} K^{II}(r, b, r, b, h) \qquad (29)$$

Figure 8:
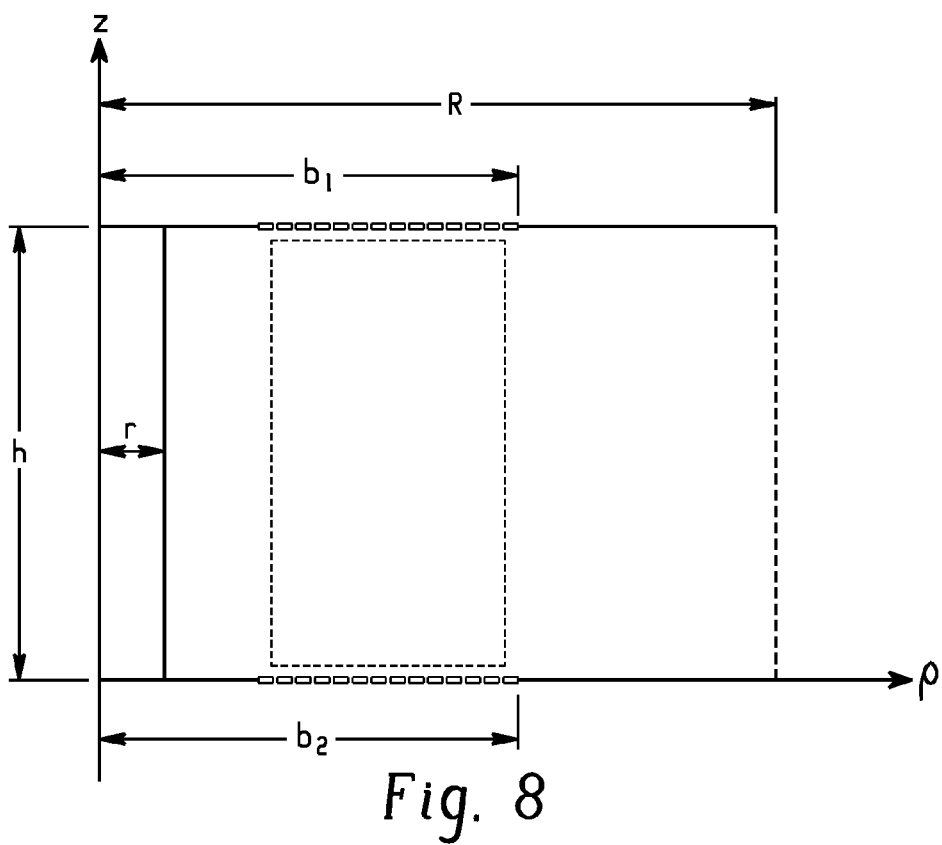
FIG. 8 is a diagram depicting a cross section of an axially symmetric via having $b_1=b_2=b$.

Consider next a symmetric via with pads ($a_1=a_2=a$, $b_1=b_2=b$), as shown in FIG. 8. The diagonal element of the admittance matrix is given by:

$$Y_{22} = \frac{2\pi}{V_2 \ln(b/r)} K^{II}(a, b, a, b, 0) \quad (30)$$

The off-diagonal element of the admittance matrix depends on the integration over the interval (r, b) at port 1:

$$Y_{12} = \frac{2\pi}{V_2 \ln(b/r)} K^{II}(a, b, a, b, h) \quad (31)$$

Figure 9:
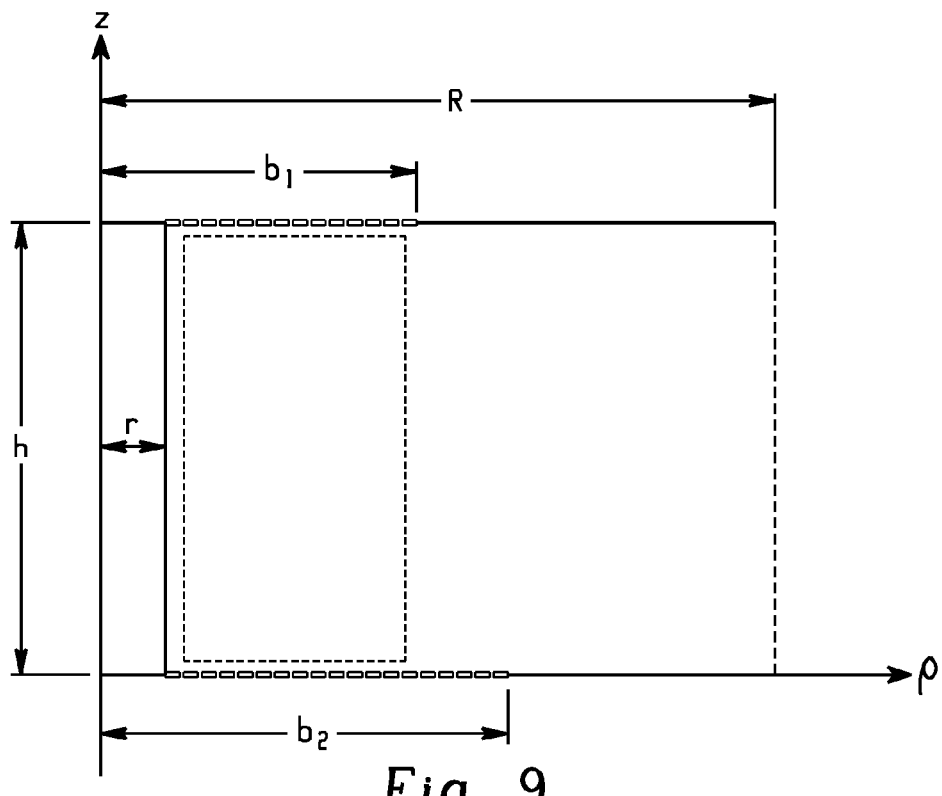
FIG. 9 is a diagram depicting an axially asymmetric via with no pads, $b_1<b_2$.

Following is a review of capacitance extraction of non-symmetric vias. Consider a via with no pads and $b_1 < b_2$, as shown in FIG. 9. The diagonal element of the admittance matrix is given by:

$$Y_{22} = \frac{2\pi}{V_2 \ln(b_2/r)} K^{II}(r, b_2, r, b_2, 0) \quad (32)$$

The off-diagonal element of the admittance matrix depends on the integration over the integral $(r, b_1)$ at port 1. Because this interval is within Region II of the magnetic field due to the source at $(r, b_2)$:

$$Y_{12} = \frac{-2\pi}{V_2 \ln(b_1/r)} K^{II}(r, b_2, r, b_1, h) \quad (33)$$

The bottom-anti-pad capacitance is given by:

$$C_{bottom} = \frac{I\pi^2 \epsilon}{h \ln\left(\frac{b_2}{r}\right)} \sum_{n=0}^{\infty} \frac{\epsilon_n}{k_n^2} \left[ H_0^{(2)}(k_n b_2) \right.$$
$$\left( \frac{(-1)^n (H_0^{(2)}(k_n b_1) J_0(k_n r) - (J_0(k_n b_1) H_0^{(2)}(k_n r))}{\ln\left(\frac{b_1}{r}\right) H_0^{(2)}(k_n r)} + \right.$$
$$\left. \left. \frac{J_0(k_n b_2)}{\ln\left(\frac{b_2}{r}\right)} \right) - \frac{H_0^{(2)}(k_n b_2)^2 J_0(k_n r)}{\ln\left(\frac{b_2}{r}\right) H_0^{(2)}(k_n r)} + \frac{2I((-1)^n - 1)}{\pi} \right] \quad (34)$$

Figure 10:
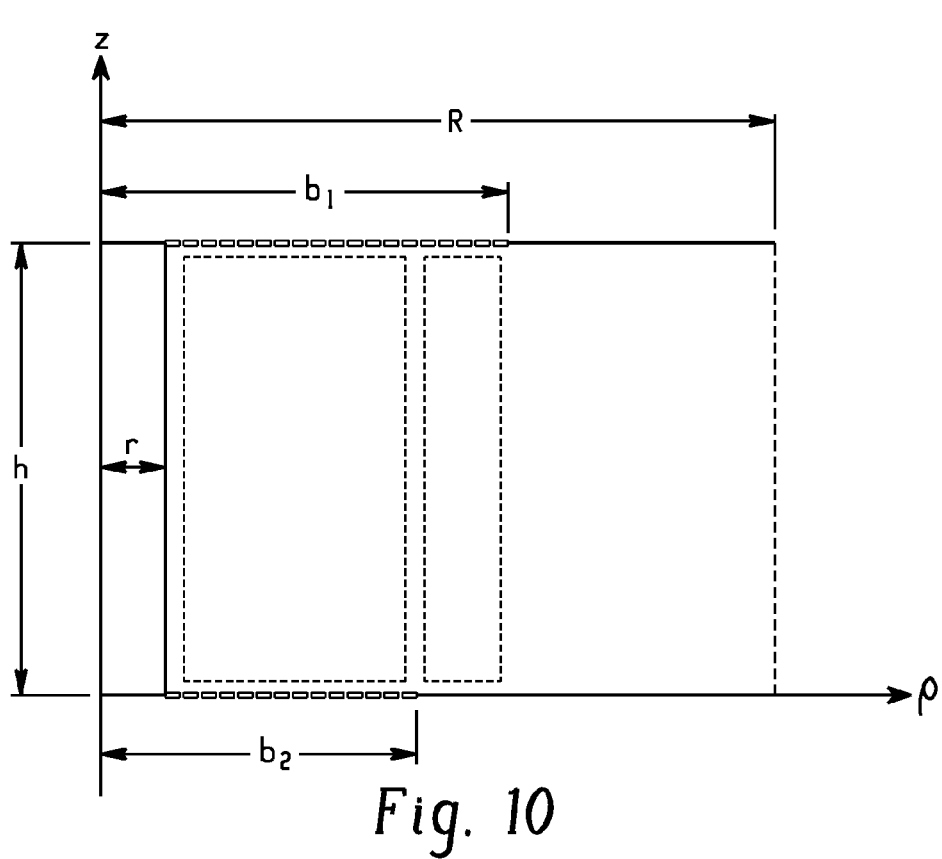
FIG. 10 is a diagram depicting an axially asymmetric via with no pads, $b_1>b_2$.
Figure 11A:
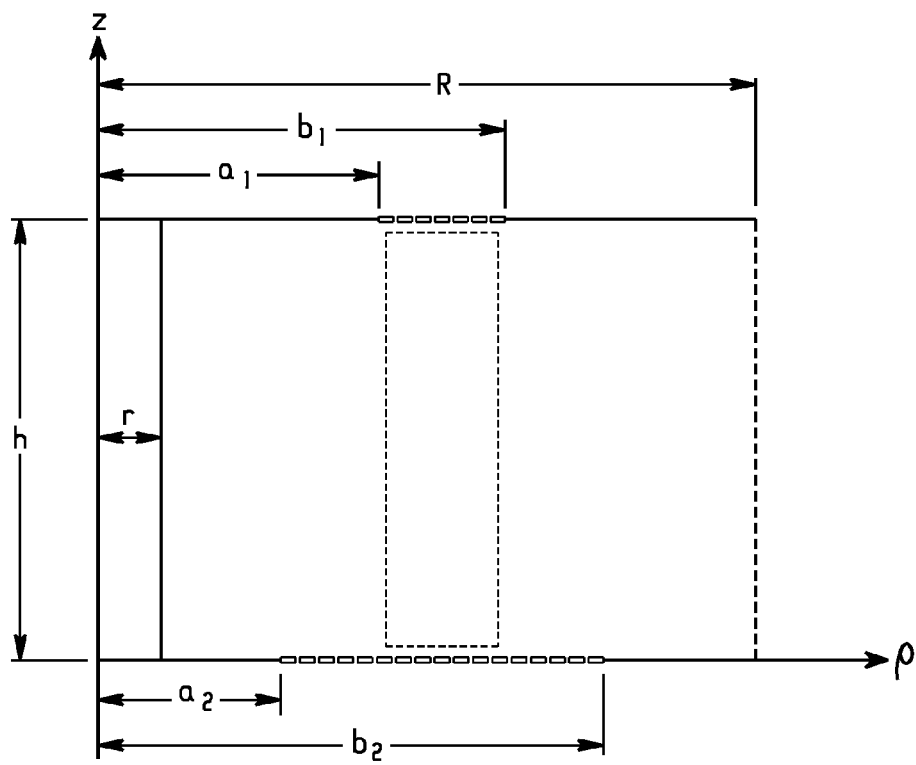
FIGS. 11A-F depict cross sections of axially asymmetric vias with pads:
(a) $r \leq a_2 \leq a_1 < b_1 \leq b_2$ (b) $r \leq a_1 < a_2 < b_2 < b_1$ (c) $r \leq a_2 \leq a_1 < b_2 < b_1$ (d) $r \leq a_1 < a_2 < b_1 \leq b_2$ (e) $r \leq a_2 < b_2 \leq a_1 < b_1$ (f) $r \leq a_1 < b_1 \leq a_2 < b_2$
Figure 11B:
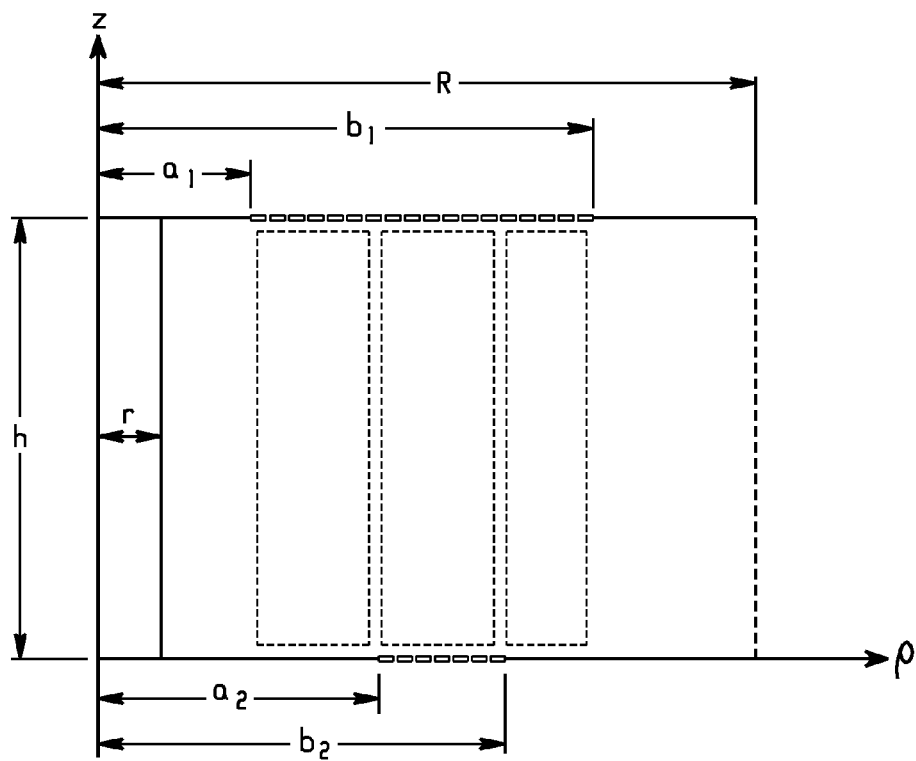
Figure 11C:
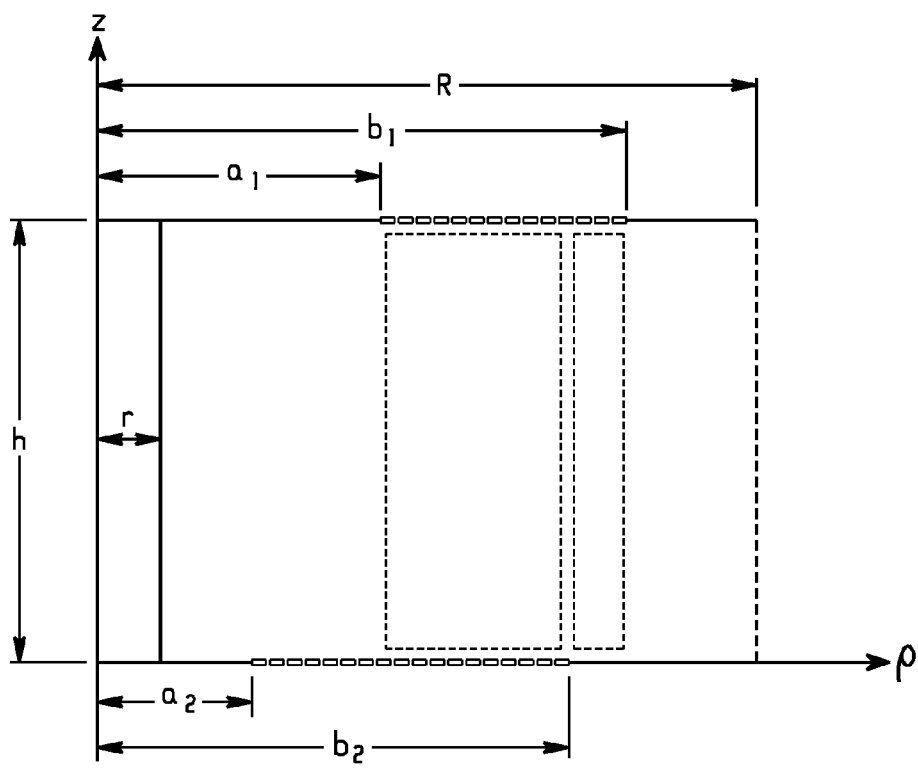
Figure 11D:
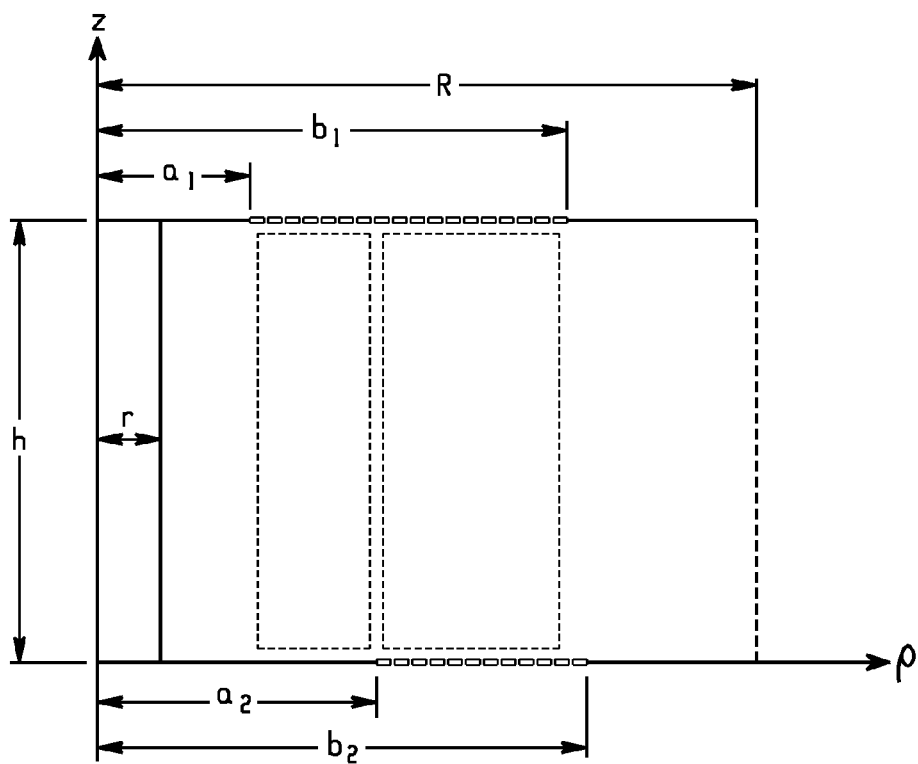
Figure 11E:
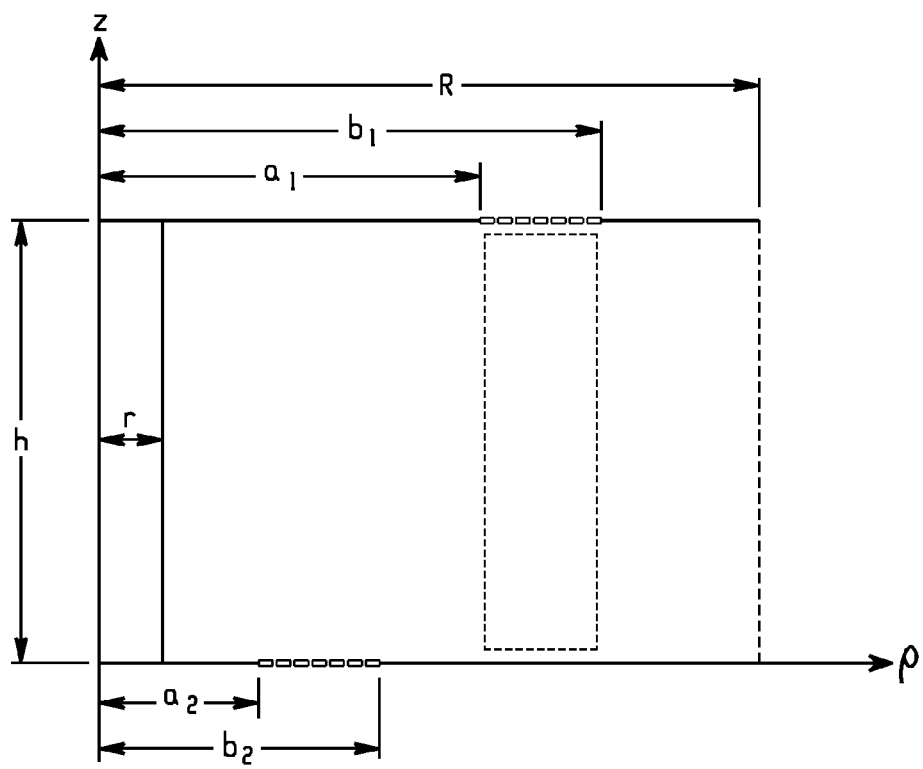
Figure 11F:
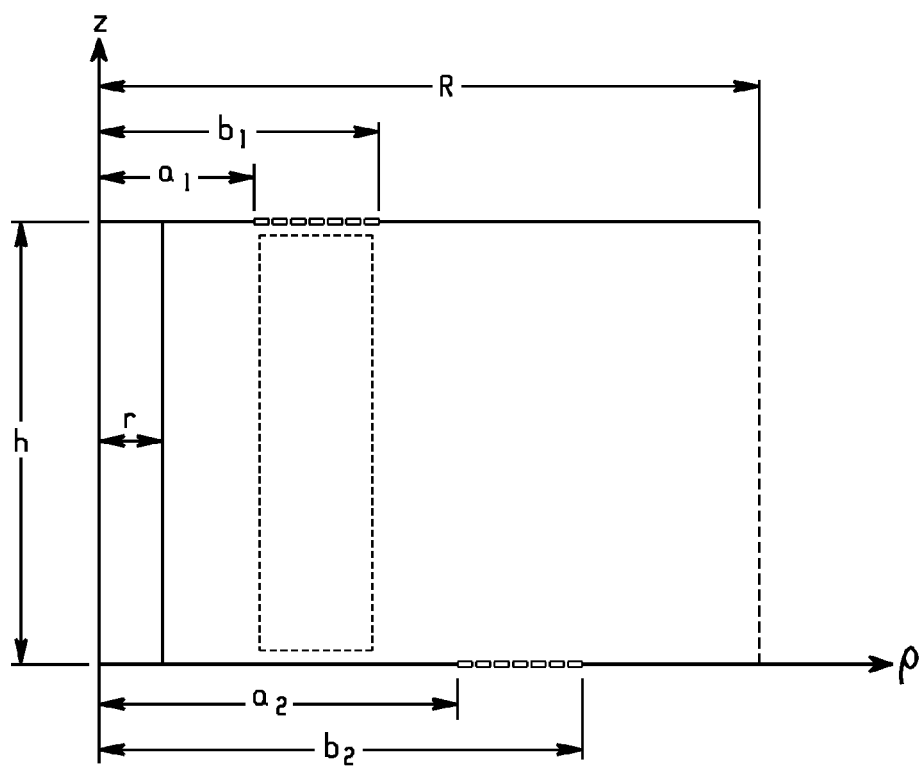

Consider next a via with no pads and $b_1 > b_2$, as shown in FIG. 10. The diagonal element of the admittance matrix is given by eq. (32). The off-diagonal element depends on the integration over $(r, b_1)$ at port 1. Because this interval spans Region II and Region III of the magnetic field due to the source at $(r, b_2)$:

$$Y_{12} = \frac{-2\pi}{V_2 \ln(b_1/r)} (K^{II}(r, b_2, r, b_2, h) + K^{III}(r, b_2, b_2, b_1, h)) \quad (35)$$

The bottom via capacitance is given by:

$$C_{bottom} = \frac{-I\pi^2 \epsilon}{h \ln\left(\frac{b_2}{r}\right)} \sum_{n=0}^{\infty} \frac{\epsilon_n}{k_n^2} \left[ \frac{H_0^{(2)}(b_2 k_n)(J_0(b_2 k_n) H_0^{(2)}(k_n r) - H_0^{(2)}(b_2 k_n) J_0(k_n r))}{\log\left(\frac{b_2}{r}\right) H_0^{(2)}(k_n r)} + \right.$$
$$\left. \frac{(-1)^n \left( \pi H_0^{(2)}(b_1 k_n)(H_0^{(2)}(b_2 k_n) J_0(k_n r) - J_0(b_2 k_n) H_0^{(2)}(k_n r)) - 2I \log\left(\frac{r}{b_2}\right) H_0^{(2)}(k_n r) \right)}{\left( \pi \log\left(\frac{b_1}{r}\right) H_0^{(2)}(k_n r) \right)} - \frac{2I}{\pi} \right] \quad (36)$$

Further consider vias with pads. The diagonal element in the admittance matrix at port 2 is given by:

$$Y_{22} = \frac{2\pi}{V_2 \ln(b_2/a_2)} K^{II}(a_2, b_2, a_2, b_2, 0) \quad (37)$$

This formula applies to all the self elements of the admittance matrix at Port 2. For the off-diagonal elements, the integration over the top-plane anti-pad is divided into the sub intervals, over which the expression of the magnetic field is applicable. There are six scenarios identified in order to cover all the possible relative positions of the top-plane anti-pad and the bottom-plane anti-pad. These six cases are illustrated in FIGS. 11A-F.

When $r \le a_2 \le a_1 < b_1 \le b_2$, the off-diagonal element of the admittance matrix is given by:

$$Y_{12} = \frac{-2\pi}{V_2 \ln(b_1/a_1)} K^{II}(a_2, b_2, a_1, b_1, h) \quad (38)$$

When $r \le a_1 < a_2 < b_2 < b_1$, the off-diagonal element of the admittance matrix is given by:

$$Y_{12} = \frac{-2\pi}{V_2 \ln(b_1/a_1)} (K^{I}(a_2, b_2, a_1, a_2, h) + K^{II}(a_2, b_2, a_2, b_2, h) + K^{III}(a_2, b_2, b_2, b_1, h)) \quad (39)$$

When $r \le a_2 \le a_1 < b_2 < b_1$, the off-diagonal element of the admittance matrix is given by:

$$Y_{12} = \frac{-2\pi}{V_2 \ln(b_1/a_1)} (K^{II}(a_2, b_2, a_1, b_2, h) + K^{III}(a_2, b_2, b_2, b_1, h)) \quad (40)$$

When $r \le a_1 < a_2 < b_1 \le b_2$, the off-diagonal element of the admittance matrix is given by:

$$Y_{12} = \frac{-2\pi}{V_2 \ln(b_1/a_1)}(K^I(a_2, b_2, a_1, a_2, h) + K^{II}(a_2, b_2, a_2, b_1, h)) \quad (41)$$

When $r \leq a_2 < b_2 \leq a_1 < b_1$, the off-diagonal element of the admittance matrix is given by:

$$Y_{12} = \frac{-2\pi}{V_2 \ln(b_1/a_1)} K^{III}(a_2, b_2, a_1, b_1, h) \quad (42)$$

When $r \leq a_1 < b_1 \leq a_2 < b_2$, the off-diagonal element of the admittance matrix is given by:

$$Y_{12} = \frac{-2\pi}{V_2 \ln(b_1/a_1)} K^I(a_2, b_2, a_1, b_1, h) \quad (43)$$

This application uses examples to illustrate the invention. The patentable scope of the invention includes other examples It is claimed:

1. A computer-implemented method for generating a computer readable model of a via for performing computer based analysis of the via, the method comprising the steps of:
   receiving in memory a data structure containing a representation of an intended physical structure of the via having intersections with a first circuit layer and a second circuit layer, the data structure comprising at least one of: (i) a first pad dimension a1 and a second pad dimension a2, and (ii) a first anti-pad dimension b1 and a second anti-pad dimension b2, wherein at least one of first and second conditions: (A) the first condition being a1 is different than a2, and (B) the second condition being b1 is different than b2, is true;
   determining by a processor, if only the first condition is true, if only the second condition is true, or if both the first and second conditions are true;
   selecting by the processor at least one model parameter based on the determination;
   computing by the processor an admittance parameter corresponding to a section of the via located between the first and second layers using the selected model parameter; and
   including the admittance parameter in the computer readable model of the via.

2. The method of claim 1, wherein:
   the via intersects an additional layer; and
   the data structure further comprises at least one of: (i) an additional pad dimension a3, and (ii) an additional anti-pad dimension b3.

3. The method of claim 2, wherein the additional layer is disposed above the first layer relative to the second layer and the method further comprises:
   comparing by the processor, at least one of: (i) the additional pad dimension a3 with the first pad dimension a1, and (ii) the additional anti-pad dimension b3 with the first anti-pad dimension b1;
   reselecting at least one model parameter based on the at least one comparison;
   computing by the processor second admittance parameter corresponding to a section of the via located between the additional layer and the first layer using the reselected model parameter; and
   including the second admittance parameter in the computer readable model of the via.

4. The method of claim 2, wherein the additional layer is disposed below the second layer relative to the first layer and the method further comprises:
   comparing by the processor, at least one of: (i) the additional pad dimension a3 with the second pad dimension a2, and (ii) the additional anti-pad dimension b3 with the second anti-pad dimension b2;
   reselecting at least one model parameter based on the at least one comparison;
   computing by the processor second admittance parameter corresponding to a section of the via located between the second layer and additional layer using the reselected model parameter; and
   including the second admittance parameter in the computer readable model of the via.

5. The method of claim 1, wherein the via intersects a plurality of layers, the method further comprising:
   selecting a pair of adjacent layers;
   designating a first layer of the selected pair as the first layer and designating a second layer of the selected pair as the second layer, whereby the computed admittance parameter corresponds to a section of the via located between the pair of adjacent layers;
   iteratively selecting another different pair of adjacent layers; and
   repeating: (i) the designation step using the other different pair, and (ii) the iterative selection step, until all pairs of adjacent layers of the plurality of layers are designated and the model of the via includes each computed admittance parameter.

6. The method of claim 5, wherein either the first layer designated as the first layer in one iteration is designated as the second layer in an immediately next iteration or the second layer in one iteration is designated as the first layer in the immediately next iteration.

7. The method claim 1, wherein:
   the first circuit layer comprises an opening, the via being disposed through the opening such that an outer surface of the via is spaced apart from an inner edge of the opening; and
   the first anti-pad dimension comprises a distance, substantially in a plane of the upper circuit layer, between an axis of the via and the inner edge of the opening.

8. The method of claim 7, wherein:
   the first pad dimension is associated with a conductive element in contact with the via and extending from the outer surface of the via such that an outer edge of the conductive element, substantially in the plane of the upper circuit layer, is spaced apart from the inner edge of the opening; and
   the first pad dimension comprises a distance, substantially in the plane of the upper circuit layer, between the axis of the via and the outer edge of the conductive element.

9. The method claim 1, wherein:
   the second circuit layer comprises an opening, the via being disposed through the opening such that an outer surface of the via is spaced apart from an inner edge of the opening; and
   the second anti-pad dimension comprises a distance, substantially in a plane of the second circuit layer, between an axis of the via and the inner edge of the opening.

10. The method of claim 9, wherein:
    the second pad dimension is associated with a conductive element in contact with the via and extending from the outer surface of the via such that an outer edge of the conductive element, substantially in the plane of the second circuit layer, is spaced apart from the inner edge of the opening; and the second pad dimension comprises a distance, substantially in the plane of the second circuit layer, between the axis of the via and the outer edge of the conductive element.

11. The method of claim 1, wherein each of the at least one selected model parameter is selected from at least one of three distinct groups of parameters based on a function of at least one of the first pad dimension, the second pad dimension, the first anti-pad dimension, and the second anti-pad dimension.

12. The method of claim 1, wherein:

a dimension of the via, r, comprises a substantially normal distance between an axis of the via and an outer surface thereof;

the dimension of the via is less than a wavelength of an electrical signal propagating through the via; and the selected model parameter is a function of, at least, the dimension of the via, r.

13. The method of claim 1, further comprising:

further determining by the processor, when both the first and second conditions are true, if at least one of the first and second pad dimensions is greater than at least one of the first and second anti-pad dimensions, wherein the selection of the at least one model parameter is further based on that further determination.

14. The method of claim 1, further comprising computing by the processor at least one additional admittance parameter using the selected model parameter.

15. The method of claim 14, wherein the computer readable model is a circuit model for electrical analysis of the via and further comprising the at least one additional admittance parameter.

16. The method of claim 15, wherein the circuit model comprises a pi network.

17. The method of claim 16, wherein the pi network includes one or more capacitors selected based on the admittance parameter and the at least one additional admittance parameter.

18. The method of claim 15, wherein the circuit model comprises a modified pi network that includes a short circuit in place of a capacitor of a standard pi model, wherein the modified pi network corresponds to a section of the via terminating at a conducting metal plane instead of traversing through the conducting metal plane.

19. A computer implemented system for generating a computer readable model of a via for performing computer based analysis of the via, comprising:

a processing system comprising one or more data processors;

a computer-readable medium encoded with instructions for commanding the processing systems to execute steps of a method comprising:

receiving in memory a data structure containing a representation of an intended physical structure of the via having intersections with a first circuit layer and a second circuit layer, the data structure comprising at least one of: (i) a a first pad dimension a1 and a second pad dimension a2, and (ii) a first anti-pad dimension b1 and a second anti-pad dimension b2, wherein at least one of first and second conditions: (A) the first condition being a1 is different than a2, and (B) the second condition being b1 is different than b2, is true;

determining by a processor, if only the first condition is true, if only the second condition is true, or if both the first and second conditions are true;

selecting at least one model parameter based on the determination;

computing by the processor an admittance parameter corresponding to a section of the via located between the first and second layers using the selected model parameter; and including the admittance parameter in the computer readable model of the via.

20. The system of claim 19, wherein the model is a circuit model that comprises a pi network.

21. A computer-readable medium encoded with instructions for commanding a processing system to implement steps of a method for generating a computer readable model of a via for performing computer based analysis of the via, the steps comprising:

receiving in memory a a data structure containing a representation of an intended physical structure of the via having intersections with a first circuit layer and a second circuit layer, the data structure comprising at least one of: (i) a a first pad dimension a1 and a second pad dimension a2, and (ii) a first anti-pad dimension b1 and a second anti-pad dimension b2, wherein at least one of first and second conditions: (A) the first condition being a1 is different than a2, and (B) the second condition being b1 is different than b2, is true;

determining by a processor, if only the first condition is true, if only the second condition is true, or if both the first and second conditions are true;

selecting at least one model parameter based on the determination;

computing by the processor an admittance parameter corresponding to a section of the via located between the first and second layers using the selected model parameter; and including the admittance parameter in the computer readable model of the via.

22. The method of claim 16, wherein a pi network is a portion of the circuit model comprising an input node and an output node in series with an element between the input node and the output node wherein each of the input node and the output node are shunted to a common node via a second element and a third element.

* * * * *